(12) United States Patent
Kusatsugu (10) Patent No.: US 7,797,930 B2
(45) Date of Patent: Sep. 21, 2010

(54) EXHAUST GAS PURIFICATION DEVICE OF INTERNAL COMBUSTION ENGINE

(75) Inventor: Hideyuki Kusatsugu, Kariya (JP)

(73) Assignee: Denso Corporation, Kariya (JP)

( * ) Notice: Subject to any disclaimer, the term of this patent is extended or adjusted under 35 U.S.C. 154(b) by 885 days.

(21) Appl. No.: 11/644,838

(22) Filed: Dec. 26, 2006

(65) Prior Publication Data

US 2007/0144146 A1 Jun. 28, 2007

(30) Foreign Application Priority Data

Dec. 26, 2005 (JP) ............................. 2005-373012

(51) Int. Cl.
*F01N 3/00* (2006.01)
*F01N 3/10* (2006.01)
(52) U.S. Cl. ................. 60/297; 60/276; 60/277; 60/284; 60/286; 60/300; 60/295; 123/672; 123/688
(58) Field of Classification Search .................. 60/297, 60/276, 277, 284, 286, 300, 295; 123/672, 123/688
See application file for complete search history.

(56) References Cited

U.S. PATENT DOCUMENTS

2005/0102076 A1 5/2005 Kariya et al.

FOREIGN PATENT DOCUMENTS

DE 10117244 A1 11/2002
JP 2003-149054 5/2003

OTHER PUBLICATIONS

Office Action dated Jul. 16, 2008 in DE Patent Application No. 102006035305.6 with English translation.

*Primary Examiner*—Thomas E. Denion
*Assistant Examiner*—Michael Carton
(74) *Attorney, Agent, or Firm*—Nixon & Vanderhye, PC (57) ABSTRACT

An ECU performs exhaust temperature control based on output values of multiple exhaust temperature sensors provided upstream and downstream of a particulate filter provided in an exhaust passage of an engine. The ECU calculates a change speed deviation value by subtracting change speed of outlet side exhaust temperature, which is sensed by one of the exhaust temperature sensors, from change speed of inlet side exhaust temperature, which is sensed by the other one of the exhaust temperature sensors, in an operation state in which temperature of exhaust gas flowing through the particulate filter changes rapidly. The ECU determines that the exhaust temperature sensors are mounted erroneously if the change speed deviation value deviates from a predetermined normal range.

7 Claims, 9 Drawing Sheets

EXHAUST GAS PURIFICATION DEVICE OF INTERNAL COMBUSTION ENGINE

CROSS REFERENCE TO RELATED APPLICATION

This application is based on and incorporates herein by reference Japanese Patent Application No. 2005-373012 filed on Dec. 26, 2005.

BACKGROUND OF THE INVENTION

1. Field of the Invention

The present invention relates to an exhaust gas purification device having an exhaust gas after treatment device in an exhaust passage of an internal combustion engine. Specifically, the present invention relates to detection of erroneous mounting of exhaust temperature sensors provided in the exhaust passage upstream and downstream of a particulate filter.

2. Description of Related Art

A diesel particulate filter (DPF) is attracting attention as an exhaust gas after treatment device of a diesel engine. The DPF is formed with multiple flow passages defined by porous ceramic walls inside. The DPF collects particulate matters contained in exhaust gas when the exhaust gas flowing into the flow passages passes through the porous ceramic walls. The particulate matters collected by the DPF are combusted and eliminated through spontaneous ignition in an operation state, in which temperature of the exhaust gas becomes high, or are compulsorily combusted and eliminated when a deposition amount of the particulate matters reaches a predetermined value. Thus, the DPF can be regenerated and used repeatedly by regularly eliminating the particulate matters.

Multiple exhaust temperature sensors are mounted in the exhaust flow passage upstream and downstream of the DPF for sensing inlet temperature and outlet temperature of the DPF. An ECU calculates the particulate matter deposition amount by using sensing results of the exhaust temperature sensors and performs temperature control during the DPF regeneration. For example, the regeneration is performed by increasing exhaust temperature by performing a post-injection or the like and by maintaining the DPF at temperature capable of combusting the particulate matters.

In order to safely perform the DPF regeneration with high controllability, it is prerequisite that the exhaust temperature sensors operate properly. Therefore, if an abnormality is caused in the exhaust temperature sensors, quick notice to a driver is necessary. Accordingly, various devices for detecting the abnormality have been proposed. For example, generation of an abnormality such as a breakage or a short circuit can be detected by comparing the sensing value of the exhaust temperature sensor with a predetermined value.

A system described in JP-A-2003-149054 has an erroneous detection reducing device applied to an exhaust temperature sensor, which outputs the same value at predetermined temperature as a value outputted when an abnormality occurs. The system improves detection accuracy by performing abnormality determination based on the sensing value only when it is estimated that the temperature is surely higher than the predetermined temperature.

The multiple exhaust temperature sensors used for sensing the temperature have the same sensor structure and characteristics including a connector shape. Connector mounting positions for connecting the exhaust temperature sensors with an engine harness are close to each other. Therefore, there is a possibility that the exhaust temperature sensors, which should be attached to an upstream portion and a downstream portion of the DPF respectively, are mounted in reverse to the intended mounting position.

In this case, the DPF inlet temperature and the DPF outlet temperature recognized by the ECU are mistaken for each other, so estimation accuracy of DPF central temperature or particulate matter deposition amount based on the DPF inlet temperature and the DPF outlet temperature is deteriorated. If the estimation accuracy of the particulate matter deposition amount is deteriorated, there is a possibility that the particulate matters are deposited over an allowable limit and high temperature is caused during the regeneration. Moreover, there is a possibility that the temperature is increased excessively due to deterioration of temperature controllability during the DPF regeneration. As a result, durability of a DPF base material or a catalyst can be degraded, and in the worst case, melt damage of the DPF can be caused. There is a possibility that other control using the DPF temperature or the exhaust temperature is also affected.

SUMMARY OF THE INVENTION

It is an object of the present invention to provide an exhaust gas purification device capable of sensing erroneous mounting of multiple exhaust temperature sensors, which are provided in an exhaust flow passage for sensing temperature of an exhaust gas after treatment device, and of safely performing exhaust temperature control based on outputs of the exhaust temperature sensors with high controllability.

According to an aspect of the present invention, an exhaust gas purification device of an internal combustion engine has an exhaust gas after treatment device provided in an exhaust passage of the engine, a plurality of exhaust temperature sensors for sensing exhaust temperature on an inlet side and an outlet side of the after treatment device, and a controller connected with the exhaust temperature sensors for performing exhaust temperature control based on output values of the exhaust temperature sensors. The controller has an erroneous mounting detector that determines that the exhaust temperature sensors are mounted erroneously if a speed change deviation value deviates from a predetermined normal range in an operation state in which the temperature of the exhaust gas flowing through the exhaust gas after treatment device changes rapidly. The change speed deviation value is calculated based on a difference between change speed of the sensed outlet side exhaust temperature and change speed of the sensed inlet side exhaust temperature.

If the operation state changes, the exhaust temperature on the inlet side of the exhaust gas after treatment device such as a particulate filter changes first. The outlet side exhaust temperature changes in retard of the inlet side temperature because of a heat capacity of the filter. Therefore, the erroneous mounting can be detected by comprehending the changes of the exhaust temperature at the time when the operation state changes rapidly and by comparing the deviation value of the change speeds of the exhaust temperature sensed by the exhaust temperature sensors with a normal value. Thus, an influence on various types of control based on the sensed temperature such as calculation of a particulate matter deposition amount or regeneration control can be reduced. Moreover, deterioration of controllability or melt damage of the filter due to erroneous sensing can be inhibited. As a result, safety and reliability of a whole system can be improved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1A:
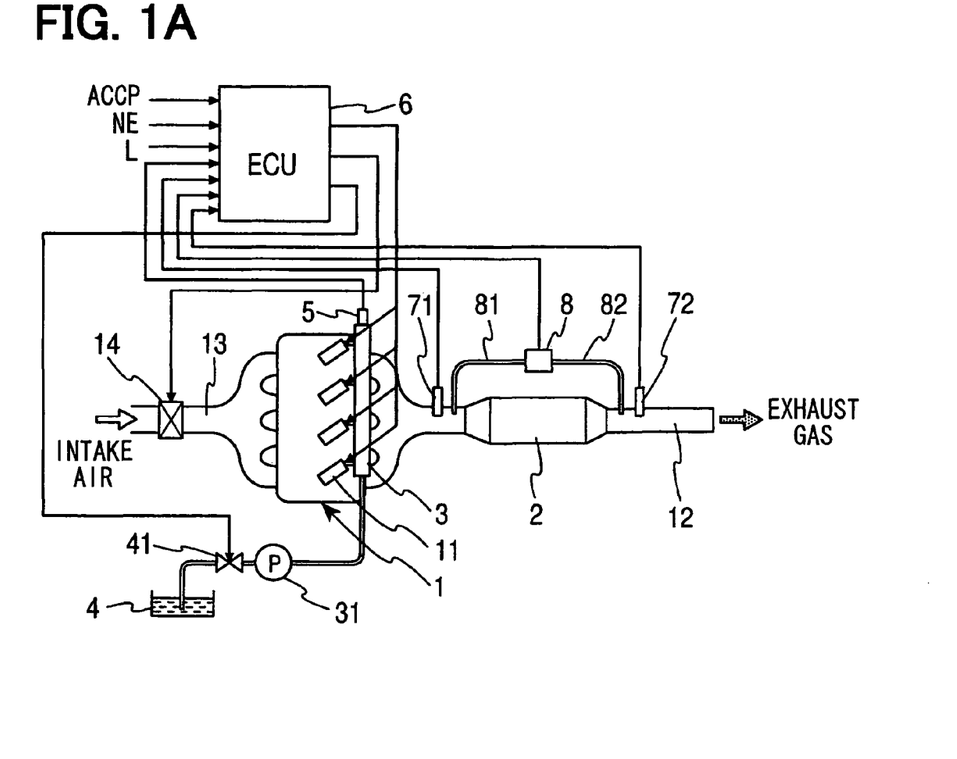
FIG. 1A is a schematic diagram showing an exhaust gas purification device of an internal combustion engine according to an example embodiment of the present invention.

Referring to FIG. 1A, an exhaust gas purification device of an internal combustion engine according to an example embodiment of the present invention is illustrated. As an example, the exhaust gas purification device of the present embodiment is applied to a four-cylinder diesel engine 1. Injectors 11 are provided in cylinders respectively. A diesel particulate filter (DPF) 2 as an exhaust gas after treatment device is provided in an exhaust passage 12 extending from an exhaust manifold. Intake air is introduced from an intake passage 13 into combustion chambers of the respective cylinders through an intake manifold. Fuel is pressure-fed from a fuel tank 4 to a common rail 3 through a metering valve 41 and a pump 31. The common rail 3 supplies the fuel to the injectors 11. An ECU 6 performs control to conform the pressure in the common rail 3 sensed by a pressure sensor 5 to a predetermined pressure.

Exhaust gas generated through the combustion contains particulate matters, which include soot (carbon) and SOF (soluble organic fractions) as main components. The DPF 2 collects the particulate matters in the exhaust passage 12 to inhibit discharge of the particulate matters to an atmosphere. For example, the DPF 2 is made of a heat-resistant porous ceramic such as a cordierite. The DPF 2 is shaped in a honeycomb structure body having multiple cells defining gas flow passages inside. The gas flow passages are blocked alternately on an inlet side or on an outlet side. The exhaust gas from the engine 1 flows between the adjacent gas flow passages through porous partition walls defining the cells. The particulate matters contained in the exhaust gas are collected when the exhaust gas passes through the porous partition walls and are deposited gradually.

The DPF 2 normally supports an oxidation catalyst. The oxidation catalyst is a noble metal catalyst such as platinum. The oxidation catalyst is applied on an inner peripheral face of the DPF 2 (surfaces of the porous partition walls). The oxidation catalyst accelerates oxidation of the collected particulate matters. By using catalytic reactions, regeneration temperature of the DPF 2 can be reduced and stable combustion can be realized. A structure that does not support the oxidation catalyst on the DPF 2 or a structure that provides the oxidation catalyst as a separate body may be employed.

An exhaust temperature sensor 71 is provided immediately upstream of the DPF 2 and an exhaust temperature sensor 72 is provided immediately downstream of the DPF 2 in the exhaust passage 12. The exhaust temperature sensors 71, 72 are connected to the ECU 6. The exhaust temperature sensors 71, 72 sense exhaust temperature immediately upstream of the DPF 2 and exhaust temperature immediately downstream of the DPF 2 and output the temperature values to the ECU 6. The temperature sensed by the upstream exhaust temperature sensor 71 is recognized as inlet side exhaust temperature of the DPF 2 (DPF inlet temperature) and the temperature sensed by the downstream exhaust temperature sensor 72 is recognized as outlet side exhaust temperature of the DPF 2 (DPF outlet temperature).

A differential pressure sensor 8 is located on the exhaust passage 12 for sensing a differential pressure across the DPF 2. An end of the differential pressure sensor 8 is connected with the exhaust passage 12 immediately upstream of the DPF 2 through a pressure introduction passage 81 and the other end of the differential pressure sensor 8 is connected with the exhaust passage 12 immediately downstream of the DPF 2 through a pressure introduction passage 82. The differential pressure sensor 8 outputs a signal to the ECU 6 in accordance with the differential pressure across the DPF 2.

An airflow meter (intake amount sensor) 14 is located in the intake passage 13 of the engine 1. The airflow meter 14 senses an intake amount and outputs the intake amount to the ECU 6.

The ECU 6 is connected with various types of sensors (not shown) such as an accelerator position sensor for sensing an accelerator position ACCP, a rotation speed sensor for sensing rotation speed NE of the engine 1 and a fuel level sensor for sensing a fuel level L. The ECU 6 performs feedback control of the engine 1 by calculating optimum fuel injection amount, optimum injection timing, optimum injection pressure and the like in accordance with operating states based on sensing signals of the sensors. The high-pressure fuel is pressure-fed to the common rail 3 by controlling the metering valve 41 such that the pressure in the common rail 3 sensed by the pressure sensor 5 coincides with a predetermined injection pressure. The fuel injection to the engine 1 is performed by driving the injector 11 at predetermined timing.

The ECU 6 monitors a state of particulate matter deposition in the DPF 2 and controls regeneration of the DPF 2. First, the ECU 6 calculates a particulate matter deposition amount in the DPF 2 (PM deposition amount) based on the sensing results of the above-described various sensors as well as the differential pressure sensor 8, the exhaust temperature sensors 71, 72, the airflow meter 14 and the like. The ECU 6 compares the calculated value of the particulate matter deposition amount with a reference value (regeneration determination deposition amount PMr) for starting the regeneration of the DPF 2 to determine whether the regeneration is necessary.

Next, the calculation of the particulate matter deposition amount performed by the ECU 6 will be explained. A calculation formula (1) of the particulate matter deposition amount is expressed as follows, for example.

$$PMfin = PMdis(\Delta P \text{ or } NE \times Q) - PMoxi(PM \times Tf), \quad (1)$$

In the formula (1), PMfin represents the final particulate matter deposition amount, PMdis is a particulate matter discharge amount, $\Delta P$ is the differential pressure across the DPF 2, Q is the fuel injection amount, PMoxi is a particulate matter oxidation amount, PM is the particulate matter deposition amount, and Tf is temperature of the DPF 2. The particulate matter discharge amount PMdis can be calculated as an estimate of the particulate matter amount discharged from the engine 1 based on the engine rotation speed NE and the injection amount Q. In the case where the differential pressure sensor 8 is provided as shown in FIG. 1A, the particulate matter discharge amount PMdis can be calculated based on the sensed differential pressure $\Delta P$ across the DPF 2. This calculation is based on the fact that a pressure loss at the DPF 2 increases as the particulate matter deposition amount increases. The differential pressure $\Delta P$ across the DPF 2 also changes in accordance with a flow rate of the exhaust gas. Therefore, modeling of these relationships is performed based on the intake flow rate sensed by the airflow meter 14, and the relationships are stored in the ECU 6 as a calculation formula of the particulate matter discharge amount PMdis in advance.

Part of the particulate matters deposited in the DPF 2 is oxidized and eliminated through a catalytic reaction. The particulate matter oxidation amount PMoxi increases as the DPF temperature Tf increases. Therefore, by using this relationship, the particulate matter oxidation amount PMoxi can be calculated based on the DPF temperature Tf. The final particulate matter deposition amount PMfin is calculated by subtracting the particulate matter oxidation amount PMoxi from the particulate matter discharge amount PMdis.

It is difficult to directly measure the temperature inside the DPF 2. Therefore, the DPF temperature (representative temperature) is estimated based on the outputs of the exhaust temperature sensors 71, 72. As a simple method, DPF outlet temperature, which reflects a state of the DPF 2 relatively suitably, may be sensed with the exhaust temperature sensor 72 and may be regarded as the DPF temperature Tf. The DPF temperature Tf can be calculated more accurately by estimating the DPF temperature Tf in consideration of a delay in the change of the DPF outlet temperature.

If the calculated value of the final particulate matter deposition amount PMfin exceeds the regeneration determination deposition amount PMr (for example, a (g)) as shown by a following expression (2), the ECU 6 determines that the regeneration of the DPF 2 is necessary and operates a temperature increasing device.

$$PMfin > a, \quad (2)$$

The ECU 6 increases the temperature of the DPF 2 to predetermined regeneration temperature (target regeneration temperature Tfr) to combust and to eliminate the particulate matters. The regeneration determination deposition amount a (g) is set at a deposition amount that does not cause melt damage due to excessive increase of the DPF temperature Tf caused by combustion of the particulate matters.

For example, a post-injection is performed as a temperature increasing method for regenerating the DPF 2. Thus, an oxidation reaction of unburned fuel is caused and the exhaust temperature is increased by reaction heat. The ECU 6 feedback-controls the DPF temperature Tf to maintain the DPF 2 at the target regeneration temperature Tfr (for example, 600° C.±50° C.). In place of the post-injection, intake restriction or timing retardation (fuel injection timing delay) can be used as the temperature increasing method. One of the temperature increasing methods may be employed or combination of two or more temperature increasing methods may be employed.

The ECU 6 continually calculates the particulate matter deposition amount during the regeneration. If the calculated particulate matter deposition amount falls below a reference value for ending the regeneration of the DPF 2 (regeneration end deposition amount, for example, b (g)) as shown by a following expression (3), the ECU 6 ends the regeneration.

$$PMfin < b, \quad (3)$$

The regeneration end deposition amount b (g) is suitably decided such that a deterioration rate of fuel consumption due to the temperature increasing operation falls within an allowable range.

Figure 1B:
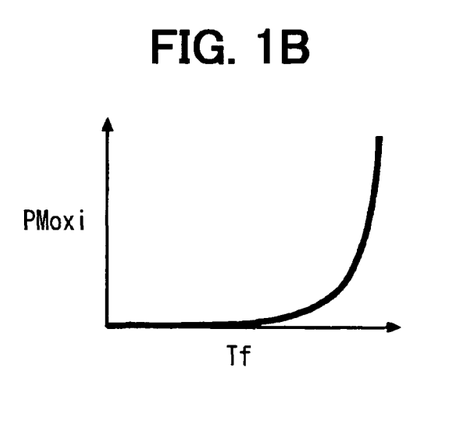
FIG. 1B is a graph showing a relationship between DPF temperature and particulate matter oxidation amount according to the FIG. 1A embodiment.

Next, erroneous mounting detection control of the exhaust temperature sensors 71, 72 according to the present embodiment will be explained. As described above, the DPF temperature Tf is used in the calculation of the final particulate matter deposition amount PMfin or the temperature control during the regeneration. Therefore, the sensing values of the exhaust temperature sensors 71, 72 have to be correctly recognized by the ECU 6. For example, if the DPF outlet temperature is erroneously recognized as being higher than actual temperature because the exhaust temperature sensors 71, 72 are mounted in reverse to the intended mounting position, i.e., because the exhaust temperature sensor 72 is erroneously mounted upstream of the DPF 2 and the exhaust temperature sensor 71 is erroneously mounted downstream of the DPF 2, the particulate matter oxidation amount PMoxi is estimated to be large as shown in FIG. 1B when the particulate matter oxidation amount PMoxi is calculated based on the expression (1). In this case, the calculation value of the final particulate matter deposition amount PMfin becomes smaller than the actual deposition amount (actual particulate matter deposition amount). Accordingly, there is a possibility that the actual particulate matter at the time when the expression (2) is established and the regeneration is started far exceeds the amount a (g). In this case, melt damage of the DPF 2 can be caused.

If the DPF outlet temperature is erroneously recognized as being lower than the actual temperature, the particulate matter oxidation amount PMoxi will be estimated to be small. In this case, the calculation value of the final particulate matter deposition amount PMfin becomes a large value. In this case, the regeneration is started before the actual particulate matter deposition amount exceeds the amount a (g). Thus, the DPF regeneration interval is shortened. As a result, the fuel consumption can be deteriorated or the thermal degradation of the DPF 2 can be caused.

Moreover, in the temperature control during the DPF regeneration, the controllability for feedback-controlling the DPF temperature Tf to the target regeneration temperature Tfr is deteriorated. For example, if the DPF outlet temperature is recognized as being lower than the actual temperature, the actual DPF temperature Tf after the feedback control becomes higher than the target regeneration temperature Tfr (for example, 600° C.). In order to conform the ECU recognition value to the target regeneration temperature Tfr, the temperature increasing operation is repeated more often than necessary. As a result, melt damage of the DPF 2, deterioration of fuel consumption or thermal degradation of the DPF 2 can be caused. In the case where the DPF outlet temperature is recognized as being higher than actual temperature, balance between the recognized value of the final particulate matter deposition amount PMfin and the actual particulate matter deposition amount in the expression (1) is broken. As a result, there is a possibility that the melt damage of the DPF 2, the deterioration of the fuel consumption or the like can be caused.

Therefore, in the present embodiment, the ECU 6 as a controller has an erroneous mounting detector for detecting the erroneous mounting of the exhaust temperature sensors 71, 72. The erroneous mounting detector calculates change speed of the inlet side exhaust temperature and change speed of the outlet side exhaust temperature sensed by the exhaust temperature sensors 71, 72. The erroneous mounting detector determines the erroneous mounting based on whether a value of deviation between the change speeds is within a predetermined normal range. Detection of the erroneous mounting during an operation state such as acceleration, deceleration or DPF regeneration, in which the exhaust temperature T rapidly changes, will be explained in detail in reference to FIGS. 1C to 5.

Figure 1C:
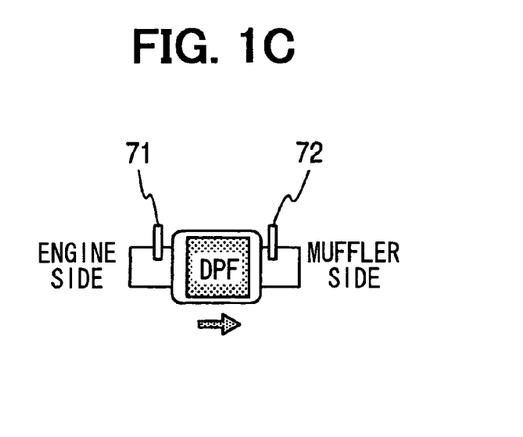
FIG. 1C is a schematic diagram showing mounting position of exhaust temperature sensors according to the FIG. 1A embodiment.
Figure 2A:
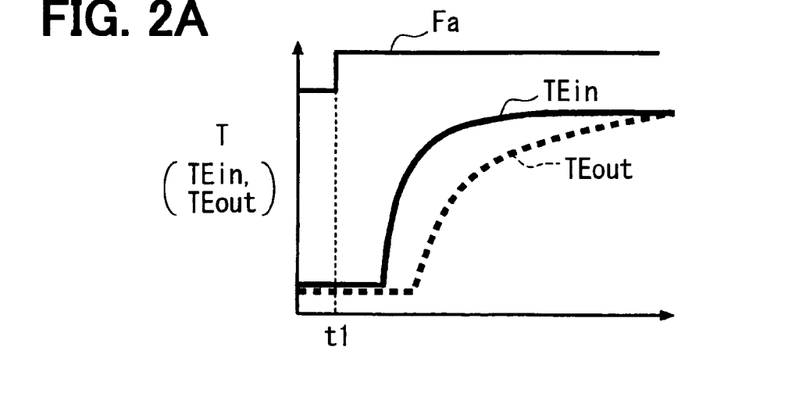
FIG. 2A is a time chart showing changes of exhaust temperature values upstream and downstream of a DPF in the case of correct mounting according to the FIG. 1A embodiment.

A solid line TEin in FIG. 2A shows a change of the DPF inlet temperature as a recognition value TEin of the ECU 6 and a broken line TEout in FIG. 2A shows a change of the DPF outlet temperature as another recognition value TEout of the ECU 6 in the case where the exhaust temperature sensor 71 is correctly mounted upstream of the DPF 2 and the exhaust temperature sensor 72 is correctly mounted downstream of the DPF 2 as shown in FIG. 1C. If an acceleration flag Fa is turned on at a reference point t1, temperature change is caused from an upstream side of the DPF 2. Accordingly, the DPF inlet temperature TEin rapidly increases, i.e., increases at high change speed TEin'. Then, the DPF outlet temperature TEout gradually increases in retard, i.e., increases at low change speed TEout', and converges to predetermined temperature. It is because the DPF 3 having the oxidation catalyst is made of a ceramic structural body having a large heat capacity.

Figure 2B:
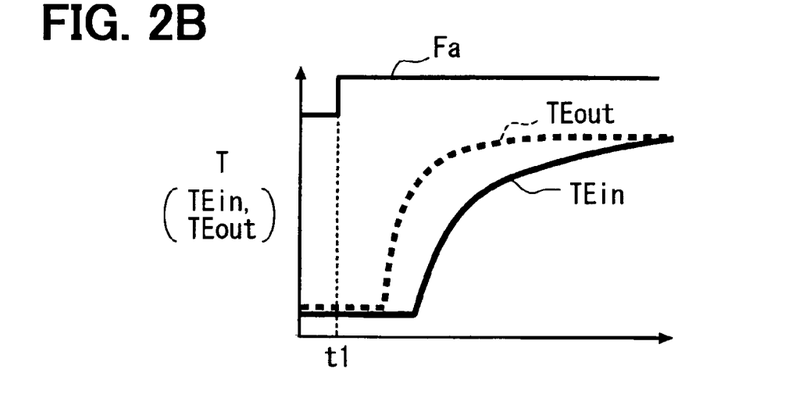
FIG. 2B is a time chart showing changes of the exhaust temperature values upstream and downstream of the DPF in the case of erroneous mounting according to the FIG. 1A embodiment.

If the exhaust temperature sensors 71, 72 are mounted in reverse to the intended mounting position, i.e., if the exhaust temperature sensor 72 is erroneously mounted upstream of the DPF 2 and the exhaust temperature sensor 71 is erroneously mounted downstream of the DPF 2, as shown in FIG. 2B, the DPF inlet temperature TEin and the DPF outlet temperature TEout are switched with each other. The ECU 6 recognizes that the DPF outlet temperature TEout rapidly increases (at high change speed TEout') and then the DPF inlet temperature TEin gradually increases (at small change speed TEin') in retard. The present invention uses the difference between the rising of the DPF inlet temperature TEin and the rising of the DPF outlet temperature TEout. The change speeds TEin', TEout' of the temperatures TEin, TEout sensed by the exhaust temperature sensors 71, 72 are calculated respectively. Then, the deviation (TEin'−TEout') between the change speeds TEin', TEout' is calculated and is used as an index for detecting the erroneous mounting.

Figure 2C:
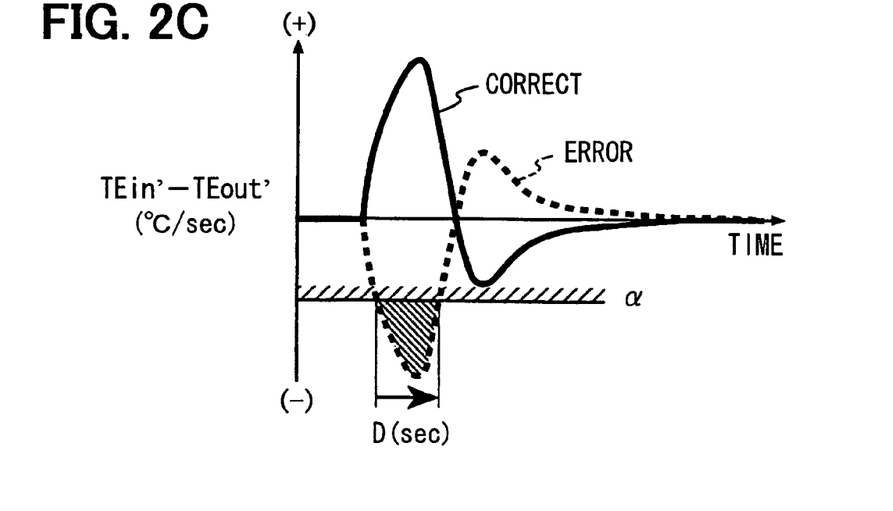
FIG. 2C is a time chart showing a speed deviation value based on change speeds of DPF inlet temperature and DPF outlet temperature according to the FIG. 1A embodiment.

FIG. 2C shows a temporal change of a speed deviation value (TEin'−TEout') calculated by subtracting the change speed TEout' of the DPF outlet temperature TEout from the change speed TEin' of the DPF inlet temperature TEin. As shown by a solid line CORRECT in FIG. 2C, the change speed TEin' on the inlet side is larger than the change speed TEoun' on the outlet side in the initial stage of the acceleration in the case where the exhaust temperature sensors 71, 72 are correctly mounted. Therefore, the speed deviation value (TEin'−TEout') takes a positive value (+). Then, the speed deviation value (TEin'−TEout') increases to a certain value. After that, the speed deviation value (TEin'−TEout') decreases and takes a negative value (−) since the change speed TEin' on the inlet side decreases and the change speed TEout' on the outlet side increases. Then, as the exhaust temperature difference across the DPF 2 decreases, the speed deviation value (TEin'−TEout') converges to zero.

In the case where the exhaust temperature sensors 71, 72 are mounted erroneously, as shown in FIG. 2C, the speed deviation value (TEin'−TEout') follows a deviation value curve (broken line ERROR) provided by inverting the correct deviation value curve (solid line CORRECT) vertically, i.e., in a direction of a positive-negative axis. In the normal case in which the exhaust temperature sensors 71, 72 are mounted correctly, the speed deviation value (TEin'−TEout') takes a positive value (+) in the initial stage of the acceleration. In contrast, in the case where the exhaust temperature sensors 71, 72 are mounted erroneously, the speed deviation value (TEin'−TEout') takes a negative value (−) continuously for a certain period. Therefore, the erroneous mounting can be sensed by calculating the speed deviation value (TEin'−TEout'), by comparing the speed deviation value (TEin'−TEout') with a predetermined erroneous mounting determination value α (<0), and by determining whether a state in which the speed deviation value (TEin'−TEout') is equal to or less than the erroneous mounting determination value α continues for at least a predetermined erroneous mounting duration D (s).

Figure 3A:
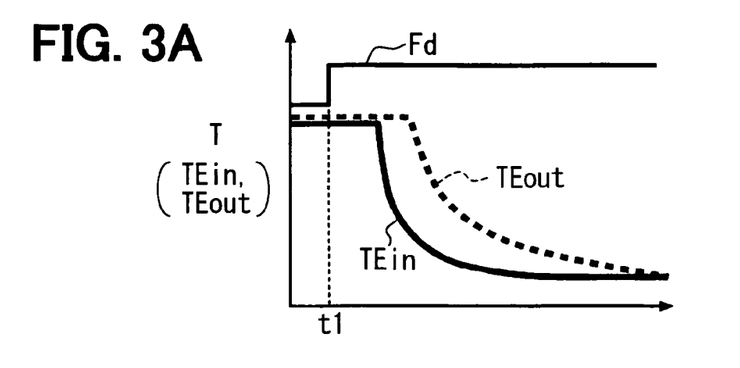
FIG. 3A is a time chart showing changes of the exhaust temperature values upstream and downstream of the DPF in the case of correct mounting according to the FIG. 1A embodiment.
Figure 3B:
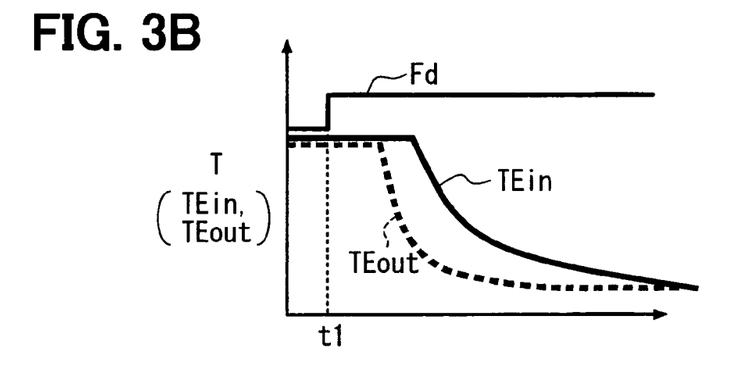
FIG. 3B is a time chart showing changes of the exhaust temperature values upstream and downstream of the DPF in the case of erroneous mounting according to the FIG. 1A embodiment.

FIG. 3A shows changes of the exhaust temperatures T (ECU recognition values TEin, TEout) during the deceleration in the case where the exhaust temperature sensors 71, 72 are mounted correctly. If a deceleration flag Fd is turned on at a reference point t1, the temperature of the exhaust gas flowing into the DPF 2 decreases. Accordingly, the DPF inlet temperature TEin rapidly decreases (at high change speed TEin') as shown by a solid line TEin in FIG. 3A. Then, the DPF outlet temperature TEout gradually decreases (at low change speed TEout') in retard and converges to certain temperature as shown by a broken line TEout in FIG. 3A. In the case where the exhaust temperature sensors 71, 72 are erroneously mounted, the ECU 6 recognizes that the DPF outlet temperature TEout rapidly decreases first (at high change speed TEout') as shown by a broken line TEout in FIG. 3B and then the DPF inlet temperature TEin gradually decreases (at low change speed TEin') in retard as shown by a solid line TEin in FIG. 3B.

Figure 3C:
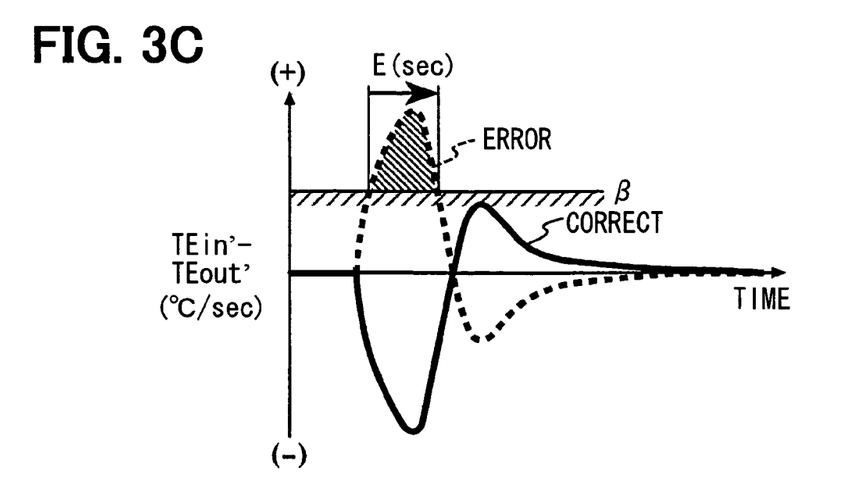
FIG. 3C is a time chart showing a speed deviation value based on change speeds of the DPF inlet temperature and the DPF outlet temperature according to the FIG. 1A embodiment.

FIG. 3C shows a change of the speed deviation value (TEin'−TEout') during the deceleration. The deviation value (TEin'−TEout') follows a curve shown in FIG. 3C conforming to a curve provided by inverting the curve in the case of acceleration shown in FIG. 2C vertically, i.e., along a positive-negative axis. The speed deviation value (TEin'−TEout') in the initial stage of the deceleration is negative in the normal case where the exhaust temperature sensors 71, 72 are mounted correctly and is positive in the erroneously mounting case where the exhaust temperature sensors 71, 72 are erroneously mounted. In the present embodiment, the calculated speed deviation value (TEin'−TEout') is compared with a predetermined erroneous mounting determination value, (>0). The erroneous mounting can be detected based on whether the state in which the speed deviation value (TEin'−TEout') is equal to or greater than the erroneous mounting determination value β continues for at least a predetermined erroneous mounting duration E (s).

Figure 4A:
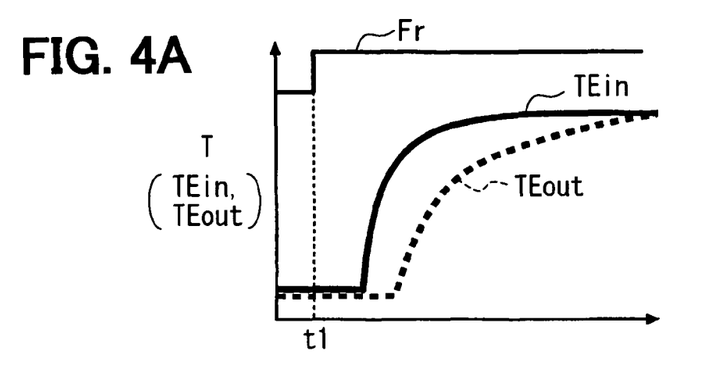
FIG. 4A is a time chart showing changes of the exhaust temperature values upstream and downstream of the DPF in the case of correct mounting according to the FIG. 1A embodiment.
Figure 4B:
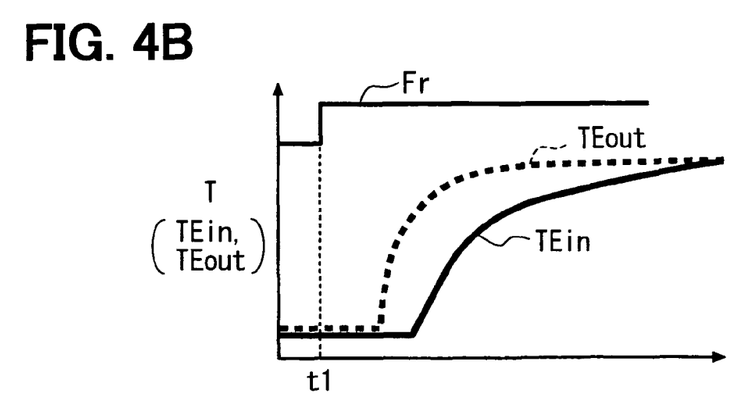
FIG. 4B is a time chart showing changes of the exhaust temperature values upstream and downstream of the DPF in the case of erroneous mounting according to the FIG. 1A embodiment.

FIG. 4A shows changes in the exhaust temperatures TEin, TEout during the regeneration control of the DPF 2 in the case where the exhaust temperature sensors 71, 72 are mounted correctly. The changes of the exhaust temperatures TEin, TEout are the same as the changes of the exhaust temperatures TEin, TEout in the case of the acceleration shown in FIG. 2A. If a DPF regeneration flag Fr is turned on at a reference point t1, the temperature increasing device operates and the temperature of the exhaust gas flowing into the DPF 2 increases. Accordingly, the DPF inlet temperature TEin rapidly increases (at high change speed TEin') as shown by a solid line TEin in FIG. 4A. Then, the DPF outlet temperature TEout gradually increases (at low change speed TEout') in retard and converges to certain temperature as shown by a broken line TEout in FIG. 4A. In the case where the exhaust temperature sensors 71, 72 are mounted erroneously, the ECU 6 recognizes that the DPF outlet temperature TEout rapidly increases first (at high change speed TEout') as shown by a broken line TEout in FIG. 4B, and then, the DPF inlet temperature TEin gradually increases (at low change speed TEin') in retard as shown by a solid line TEin FIG. 4B.

Figure 4C:
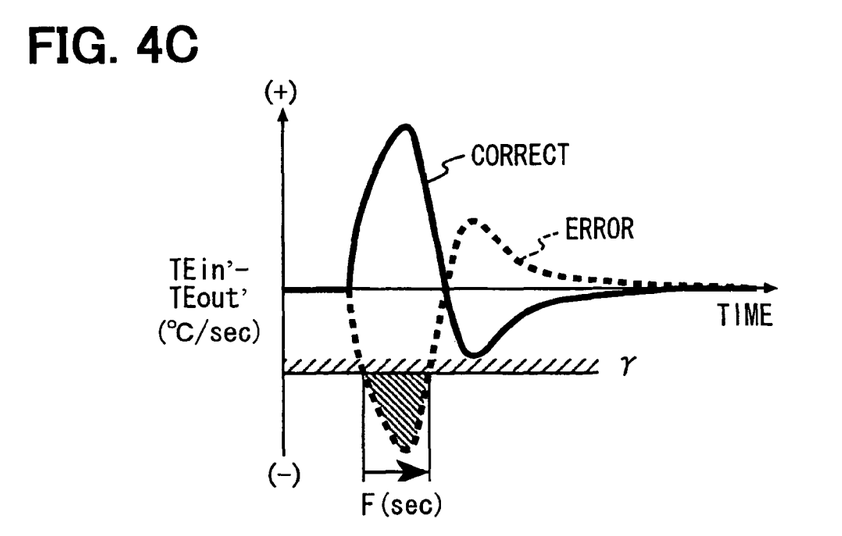
FIG. 4C is a time chart showing a speed deviation value based on change speeds of the DPF inlet temperature and the DPF outlet temperature according to the FIG. 1A embodiment.

FIG. 4C shows a change of the speed deviation value (TEin'−TEout') during the DPF regeneration. Like the case of the acceleration shown in FIG. 2C, the speed deviation value (TEin'−TEout') in the initial stage of the regeneration takes a positive value (+) in the normal case where the exhaust temperature sensors 71, 72 are mounted correctly but takes a negative value (−) in the erroneously mounting case where the exhaust temperature sensors 71, 72 are mounted erroneously. Therefore, in the present embodiment, the calculated speed deviation value (TEin'−TEout') is compared with a predetermined erroneous mounting determination value γ (<0). The erroneous mounting can be detected based on whether the state in which the speed deviation value (TEin'−TEout') is equal to or less than the erroneous mounting determination value γ continues for at least a predetermined erroneous mounting duration F (s).

If the erroneous mounting is detected, a failure warning lamp (MIL) is turned on to notify the driver of the erroneous mounting such that the driver can bring the vehicle to a car dealer or the like at once. In the present embodiment, as a treatment performed until the driver brings the vehicle to the car dealer or the like, self-normalization is executed by artificially switching over the recognition values TEin, TEout in the ECU 6 to each other to enable the regeneration control of the DPF 2. The ECU 6 has a gradual change control device for gradually changing the ECU recognition values TEin, TEout of the inlet side exhaust temperature and the outlet side exhaust temperature to a predetermined exhaust temperature setting value lower than the regeneration execution enabling temperature and a switch device for switching over the recognition values TEin, TEout of the inlet side exhaust temperature and the outlet side exhaust temperature inputted into the ECU 6 to each other after the gradual change control.

Figure 5:
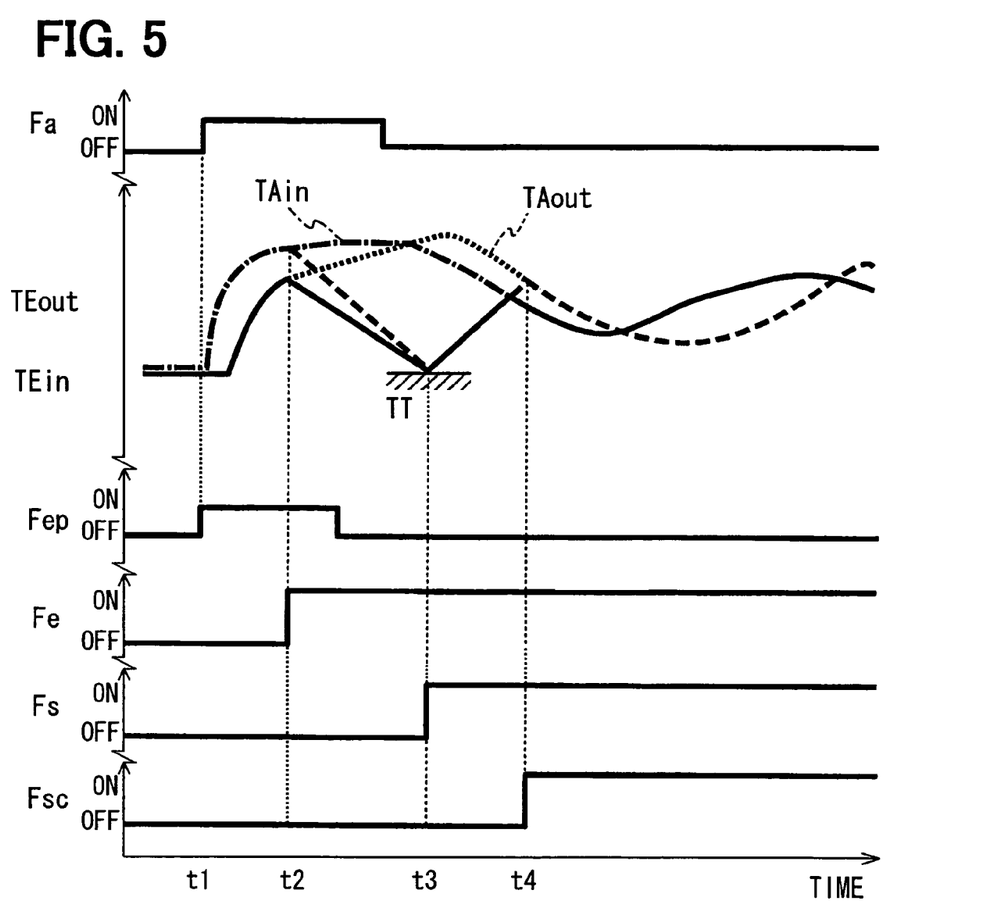
FIG. 5 is a time chart showing gradual change control and a method of switching control after detection of the erroneous mounting according to the FIG. 1A embodiment.

FIG. 5 is a time chart showing an example of the artificial switching of the recognition values TEin, TEout. An erroneous mounting detection permission flag Fep is turned on at the same time as the start of the acceleration (timing t1). The sensing value of the exhaust temperature sensor 71 is inputted into the ECU 6 as the DPF inlet temperature (ECU recognition value) TEin, and the sensing value of the exhaust temperature sensor 72 is inputted into the ECU 6 as the DPF outlet temperature (ECU recognition value) TEout. The ECU 6 determines the erroneous mounting based on the ECU recognition values TEin, TEout as described above, turns on an erroneous determination flag Fe and operates the gradual change control device. In the gradual change control between timing t2 and t3, both of the DPF inlet temperature TEin and the DPF outlet temperature TEout recognized by the ECU 6 are gradually decreased to a certain low exhaust temperature setting value (target exhaust temperature TT). After the target exhaust temperature TT is reached at timing t3, a switching flag Fs is turned on to switch over the ECU recognition values TEin, TEout corresponding to the DPF inlet temperature and the DPF outlet temperature to each other.

One of conditions for performing the regeneration of the DPF 2 is that the catalyst of the DPF 2 is activated. If the regeneration is performed in a state in which the catalyst is not activated, there is a possibility that a white smoke is generated by unburned fuel. Therefore, the target exhaust temperature TT is set at temperature not activating the DPF 2. Thus, after the erroneous mounting is detected, execution of the regeneration in a state in which the DPF 2 is not activated is avoided and generation of the white smoke is inhibited.

Then, the DPF inlet temperature TEin and the DPF outlet temperature TEout recognized by the ECU 6 are gradually increased. The recognized DPF inlet temperature TEin and the recognized DPF outlet temperature TEout are gradually changed until the recognized DPF inlet temperature TEin and the recognized DPF outlet temperature TEout coincide with inlet side actual exhaust temperature TAin and outlet side actual exhaust temperature TAout respectively. A switching completion flag Fsc is turned on at timing t4 if the recognized DPF inlet temperature TEin shown by a solid line TEin in FIG. 5 reaches the inlet side actual exhaust temperature TAin shown by a chained line TAin and the recognized DPF outlet temperature TEout shown by a broken line TEout reaches the outlet side actual exhaust temperature TAout shown by a dotted line TAout.

By the gradual change control, a problem caused by immediately switching the DPF inlet temperature TEin and the DPF outlet temperature TEout recognized by the ECU 6 can be avoided. Specifically, in the case where early warm-up control is performed through feedback of the exhaust temperature (DPF inlet temperature TEin or DPF outlet temperature TEout) in order to quickly activate the catalyst supported on the DPF 2 or the like or an air-fuel ratio sensor, torque fluctuation or deterioration of a combustion noise can be caused if control values are changed rapidly. The gradual change control has an effect of decreasing the influences on the control.

Figure 6:
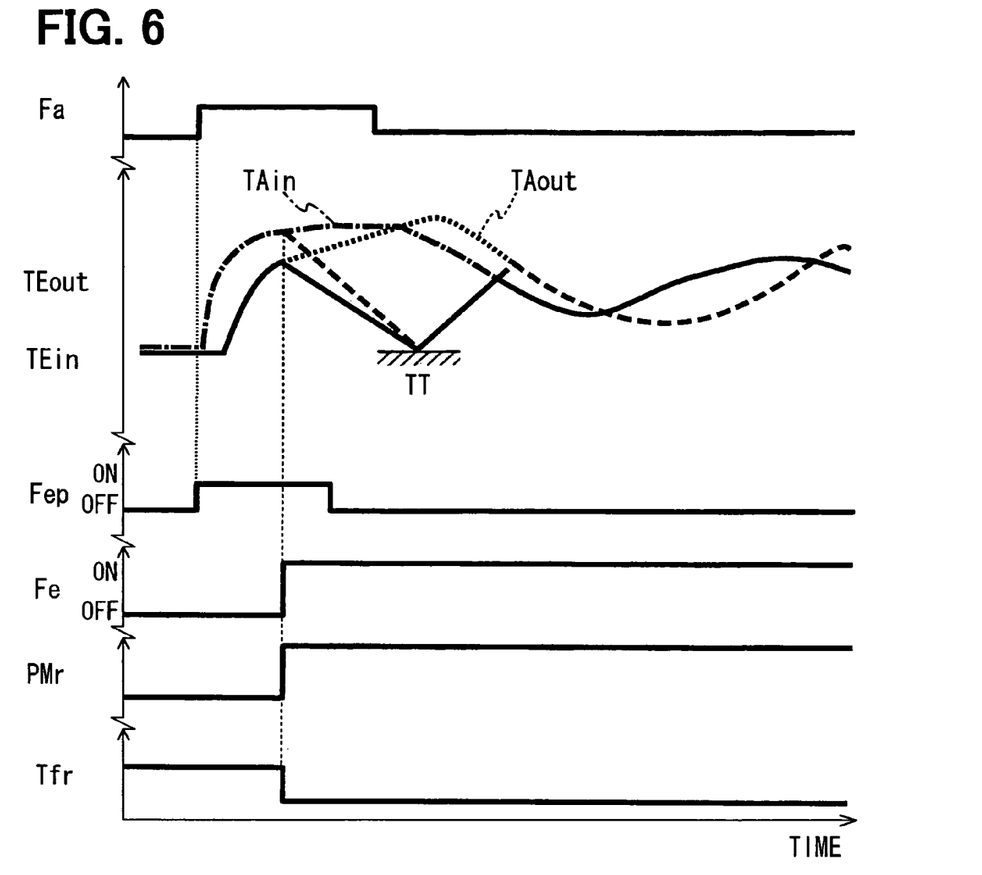
FIG. 6 is a time chart showing a method of changing setting values during regeneration control after the detection of the erroneous mounting according to the FIG. 1 embodiment.

In order to calculate the particulate deposition amount PM or to perform the temperature control safely during the regeneration control, as shown in FIG. 6, setting values may be changed to increase the DPF regeneration execution particulate matter deposition amount PMr during the regeneration control if the erroneous mounting is determined. Alternatively, the estimate of the particulate matter deposition amount PM may be reduced. A deviation is caused between the particulate matter deposition amount PM recognized by the ECU 6 and the actual particulate matter deposition amount PM due to the erroneous mounting. The deterioration of controllability such as execution of the regeneration of the DPF 2 in an early stage can be inhibited in the present embodiment.

The setting values may be changed such that the target DPF regeneration temperature Tfr decreases. Thus, the temperature increase of the DPF 2 during the regeneration is inhibited and melt damage and the like due to the excessive temperature increase can be prevented.

Figure 7:
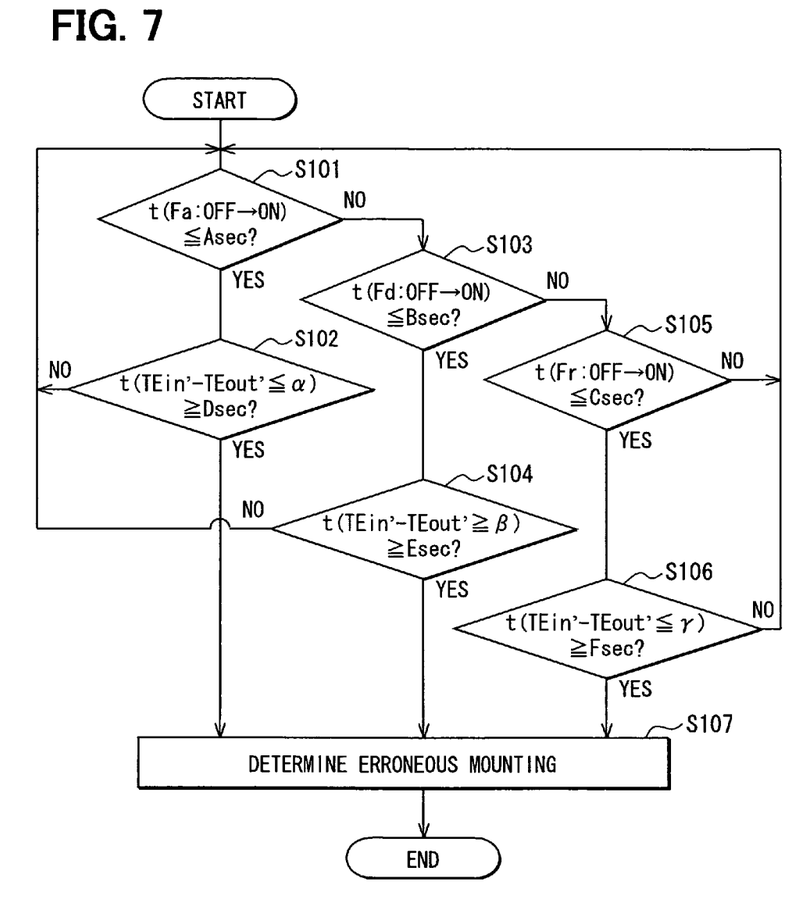
FIG. 7 is a flowchart showing a method of detecting the erroneous mounting performed by an ECU according to the FIG. 1A embodiment.
Figure 8A:
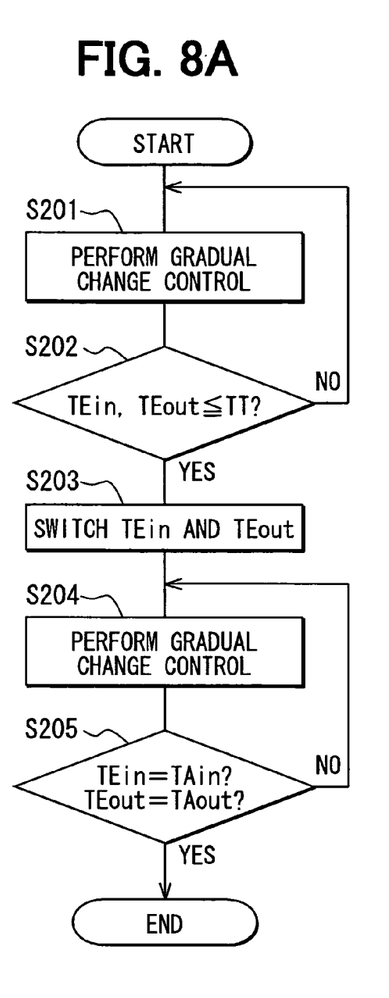
FIG. 8A is a flowchart showing the gradual change control and the switching method performed by the ECU according to the FIG. 1A embodiment.
Figure 8B:
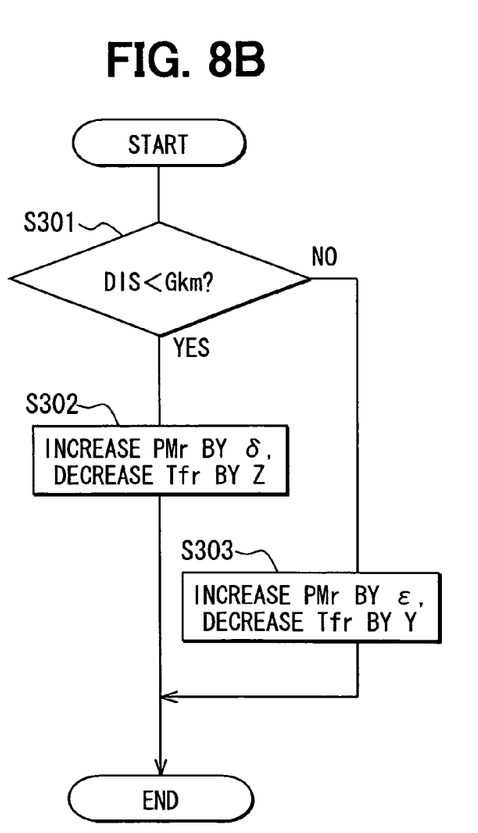
FIG. 8B is a flowchart showing the method of changing the setting values during the regeneration control according to the FIG. 1A embodiment.

FIGS. 7 to 8B show flowcharts of erroneous mounting detection control performed by the ECU 6. FIG. 7 shows processing as an erroneous mounting detector. First, Step S101 determines whether an elapsed time t(Fa: OFF→ON) since the acceleration flag Fa is switched from OFF to ON is equal to or shorter than a time A (s). If Step S101 is YES, the process goes to Step S102. Step S102 calculates the speed deviation value (TEin'−TEout') from the change speed TEin' of the DPF inlet temperature TEin and the change speed TEout' of the DPF outlet temperature TEout and compares the speed deviation value (TEin'−TEout') with the erroneous mounting determination value α (<0) shown in FIG. 2C. Step S102 determines whether a state in which the speed deviation value (TEin'−TEout') is equal to or less than the erroneous mounting determination value α continues for at least the erroneous mounting duration D (s). If Step S102 is YES, the process goes to Step S107 to turn on the erroneous mounting determination flag Fe.

If Step S101 is NO, the process goes to Step S103 to determine whether an elapsed time t(Fd: OFF→ON) since the deceleration flag Fd is switched from OFF to ON is equal to or shorter than a time B (s). If Step S103 is YES, the process goes to Step S104. Step S104 calculates the speed deviation value (TEin'−TEout') from the change speed TEin' of the DPF inlet temperature TEin and the change speed TEout' of the DPF outlet temperature TEout and compares the speed deviation value (TEin'−TEout') with the erroneous mounting determination value β (<0) shown in FIG. 3C. Step S104 determines whether a state in which the speed deviation value (TEin'−TEout') is equal to or greater than the erroneous mounting determination value β continues for at least the erroneous mounting duration E (s). If Step S104 is YES, the process goes to Step S107 to turn on the erroneous mounting determination flag Fe.

If Step S103 is NO, the process goes to Step S105 to determine whether an elapsed time t(Fr: OFF→ON) since the DPF regeneration flag Fr is switched from OFF to ON is equal to or shorter than a time C (s). If Step S105 is YES, the process goes to Step S106. Step S106 calculates the speed deviation value (TEin'−TEout') from the change speed TEin' of the DPF inlet temperature TEin and the change speed TEout' of the DPF outlet temperature TEout and compares the speed deviation value (TEin'−TEout') with the erroneous mounting determination value γ (<0) shown in FIG. 4C. Step S106 determines whether a state in which the speed deviation value (TEin'−TEout') is equal to or less than the erroneous mounting determination value γ continues for at least the erroneous mounting duration F (s). If Step S106 is YES, the process goes to Step S107 to turn on the erroneous mounting determination flag Fe.

FIG. 8A shows processing as a gradual change control device and a switch device. First, Step S201 performs the gradual change control to gradually decrease the recognition values TEin, TEout of the DPF inlet temperature and the DPF outlet temperature based on the sensing values of the exhaust temperature sensors 71, 72. The control amounts during the gradual change control are suitably set to reduce the influence on other control performed based on the DPF inlet temperature or the DPF outlet temperature. Then, Step S202 determines whether the ECU recognition values (exhaust temperature sensor values) TEin, TEout of the DPF inlet temperature and the DPF outlet temperature corresponding to the exhaust temperature sensors 71, 72 are equal to or lower than target exhaust temperature TT after the gradual change shown in FIG. 5. If Step S202 is NO, the process returns to Step S201 to repeat the gradual change control. If Step S202 is YES, the process goes to Step S203. Step S203 switches the sensing values of the inlet side exhaust temperature sensor 71 and the outlet side exhaust temperature sensor 72, i.e., the ECU recognition value TEin of the DPF inlet temperature and the ECU recognition value TEout of the DPF outlet temperature. Then, Step S204 gradually increases the DPF inlet temperature (ECU recognition value TEin) and the DPF outlet temperature (ECU recognition value TEout). Step S205 determines whether the ECU recognition values TEin, TEout after the gradual change respectively reach the actual exhaust temperatures TAin, TAout sensed by the exhaust temperature sensors 71, 72. If Step S205 is NO, the process returns to Step S204 to perform the gradual change control again. This processing is repeated until Step S205 becomes YES.

FIG. 8B shows processing as an offset device. First, Step S301 determines whether a distance DIS traveled after the end of the previous DPF regeneration control is less than a value G (km). If Step S301 is YES, the process goes to Step S302 to increase the setting value of the DPF regeneration execution particulate matter deposition amount PMr by a predetermined offset amount δ. Alternatively, the setting value of the target DPF regeneration temperature Tfr may be reduced by a predetermined offset amount Z. If Step S301 is NO, the process goes to Step S303 to increase the setting value of the DPF regeneration execution particulate matter deposition amount PMr by a predetermined offset amount ε (>δ). Alternatively, the setting value of the target DPF regeneration temperature Tfr may be reduced by a predetermined offset amount Y (>Z). By changing the offset amount in accordance with the travel distance DIS, the regeneration can be controlled more suitably with high controllability. The determination may be performed by using a drive time in place of the travel distance DIS.

Thus, the present invention facilitates the detection of the erroneous mounting by using the temperature change speed at the time when the operation state rapidly changes, so the driver is informed of the erroneous mounting. Accordingly, deterioration of the estimation accuracy of the DPF temperature or the particulate matter deposition amount or deterioration of the temperature controllability during the regeneration can be avoided. Moreover, the exhaust temperature sensor values are switched through the gradual change control in the case of erroneous mounting. Accordingly, the regeneration control of the DPF 2 can be performed safely and suitably even before the exhaust temperature sensors are remounted correctly.

Figure 9A:
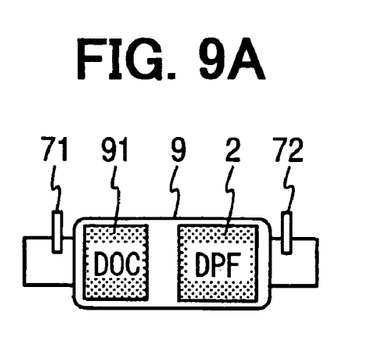
FIGS. 9A to 9F are schematic diagrams showing exhaust gas after treatment devices and mounting positions of exhaust temperature sensors of modified examples of the FIG. 1A embodiment.
Figure 9B:
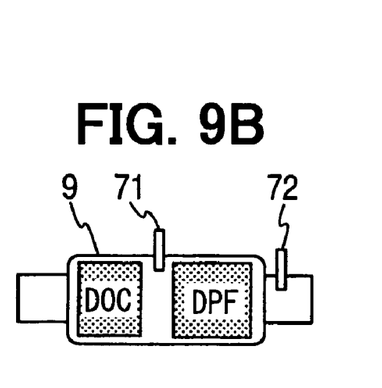
Figure 9C:
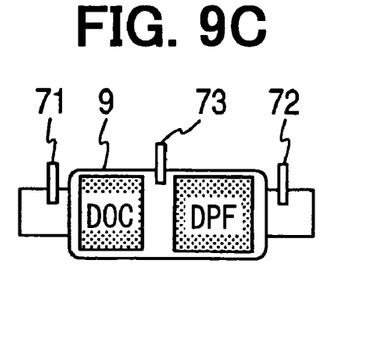

In the above-described embodiment, as shown in FIG. 1C, the exhaust temperature sensors 71, 72 are provided upstream and downstream of the DPF 2 having the catalyst. Other than this structure, the present invention can be applied to structures having various types of exhaust gas after treatment devices. FIG. 9A, 9B or 9C each shows an example of an exhaust gas after treatment device 9 including an oxidation catalyst (DOC) 91 upstream of the DPF 2. The exhaust temperature sensors 71, 72 may be provided upstream and downstream of the exhaust gas after treatment device 9 including the DOC 91 and the DPF 2 as shown in FIG. 9A. Alternatively, the exhaust temperature sensors 71, 72 may be provided immediately upstream of and downstream of the DPF 2 as shown in FIG. 9B. Alternatively, three exhaust temperature sensors 71, 72, 73 may be provided upstream of the exhaust after treatment device 9, downstream of the exhaust gas after treatment device 9 and between the DOC 91 and the DPF 2 as shown in FIG. 9C.

Figure 9D:
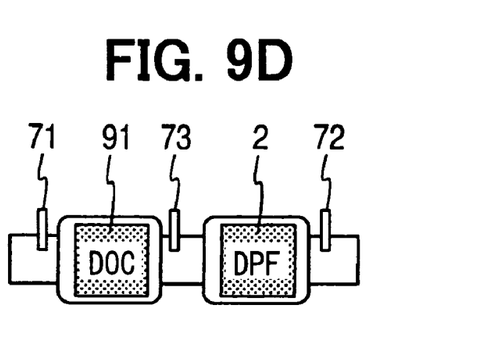
Figure 9E:
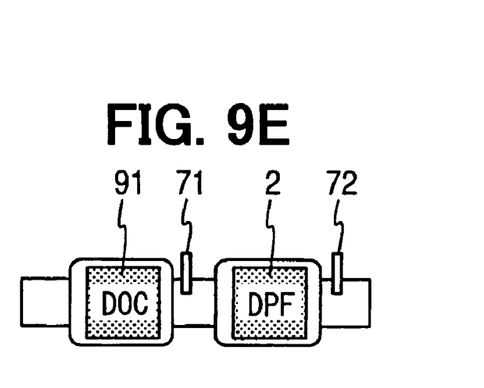
Figure 9F:
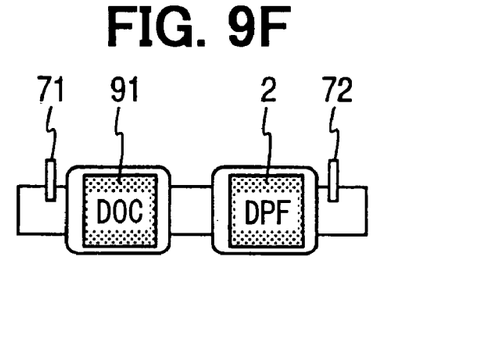

The DOC 91 may be provided separately upstream of the DPF 2 as shown in FIGS. 9D to 9F In this case, the exhaust temperature sensors 71, 72 may be provided immediately upstream and downstream of the DPF 2 as shown in FIG. 9E. Alternatively, the exhaust temperature sensor 71 may be provided upstream of the DOC 91 and the exhaust temperature sensor 72 may be provided downstream of the DPF 2 as shown in FIG. 9F. Alternatively, three exhaust temperature sensors 71, 72, 73 may be provided upstream of the DOC 91, downstream of the DPF 2 and between the DOC 91 and the DPF 2 as shown in FIG. 9D. In every structure, the erroneous mounting can be detected based on the deviation between the temperature change speeds sensed by the multiple exhaust temperature sensors.

The present invention should not be limited to the disclosed embodiments, but may be implemented in many other ways without departing from the spirit of the invention.

What is claimed is:

1. An exhaust gas purification device of an internal combustion engine, the exhaust gas purification device comprising:

an exhaust gas after treatment device provided in an exhaust passage of the engine;

a plurality of exhaust temperature sensors for sensing exhaust temperature on an inlet side of the exhaust gas after treatment device and exhaust temperature on an outlet side of the exhaust gas after treatment device; and a controller connected with the exhaust temperature sensors for performing exhaust temperature control based on output values of the exhaust temperature sensors, wherein the controller includes an erroneous mounting detector for determining that the exhaust temperature sensors are mounted erroneously in such a way that the exhaust temperature sensor for sensing the exhaust temperature on the inlet side of the exhaust gas after treatment device is mounted erroneously to sense the exhaust temperature on the outlet side of the exhaust gas after treatment device and the exhaust temperature sensor for sensing the exhaust temperature on the outlet side of the exhaust gas after treatment device is mounted erroneously to sense the exhaust temperature on the inlet side of the exhaust gas after treatment device if a change speed deviation value deviates from a predetermined normal range in an operation state in which the temperature of the exhaust gas flowing through the exhaust gas after treatment device changes rapidly, the change speed deviation value calculated based on a difference between change speed of the sensed outlet side exhaust temperature and change speed of the sensed inlet side exhaust temperature.

2. The exhaust gas purification device as in claim 1, wherein the exhaust gas after treatment device is a particulate filter, and the operation state in which the temperature of the exhaust gas flowing through the exhaust gas after treatment device changes rapidly is at least one of an acceleration period of the engine, a deceleration period of the engine and a regeneration control period of the particulate filter.

3. The exhaust gas purification device as in claim 2, wherein the change speed deviation value is calculated by subtracting the change speed of the sensed outlet side exhaust temperature from the change speed of the sensed inlet side exhaust temperature, and the erroneous mounting detector determines that the exhaust temperature sensors are mounted erroneously if a state in which the change speed deviation value is equal to or less than a predetermined value continues for at least a predetermined period during the acceleration period of the engine, if a state in which the change speed deviation value is equal to or less than a certain value continues for at least a certain period during the regeneration control period of the particulate filter or if a state in which the change speed deviation value is equal to or greater than a given value continues for at least a given period during the deceleration period of the engine.

4. The exhaust gas purification device as in claim 1, wherein the controller includes:

a gradual change control device for performing gradual change control of gradually changing recognition values of the inlet side exhaust temperature and the outlet side exhaust temperature recognized by the controller to a predetermined exhaust temperature setting value lower than predetermined regeneration execution enabling temperature if the erroneous mounting detector determines that the exhaust temperature sensors are mounted erroneously; and a switch device for switching over the recognition values of the inlet side exhaust temperature and the outlet side exhaust temperature recognized by the controller to each other after the recognition values reach the setting value through the gradual change control.

5. The exhaust gas purification device as in claim 4, wherein the gradual change control device, after the switch device switches over the recognition values of the inlet side exhaust temperature and the outlet side exhaust temperature to each other, gradually changes the recognition values until the recognition values respectively conform to the output values of the exhaust temperature sensors.

6. The exhaust gas purification device as in claim 1, wherein the exhaust gas after treatment device is a particulate filter, and the controller, when the erroneous mounting detector determines that the exhaust temperature sensors are mounted erroneously, changes setting of an estimate of a deposition amount of particulate matters deposited in the particulate filter calculated based on the output values of the exhaust temperature sensors or setting of a regeneration execution value of the deposition amount of the particulate matters as an execution condition of the regeneration of the particulate filter.

7. The exhaust gas purification device as in claim 1, wherein the exhaust gas after treatment device is a particulate filter, and the controller changes setting of target temperature during the regeneration of the particulate filter if the erroneous mounting detector determines that the exhaust temperature sensors are mounted erroneously.

* * * * *